C. F. Brown.
Steering.
Nº 7,516      Patented Jul. 22, 1850.
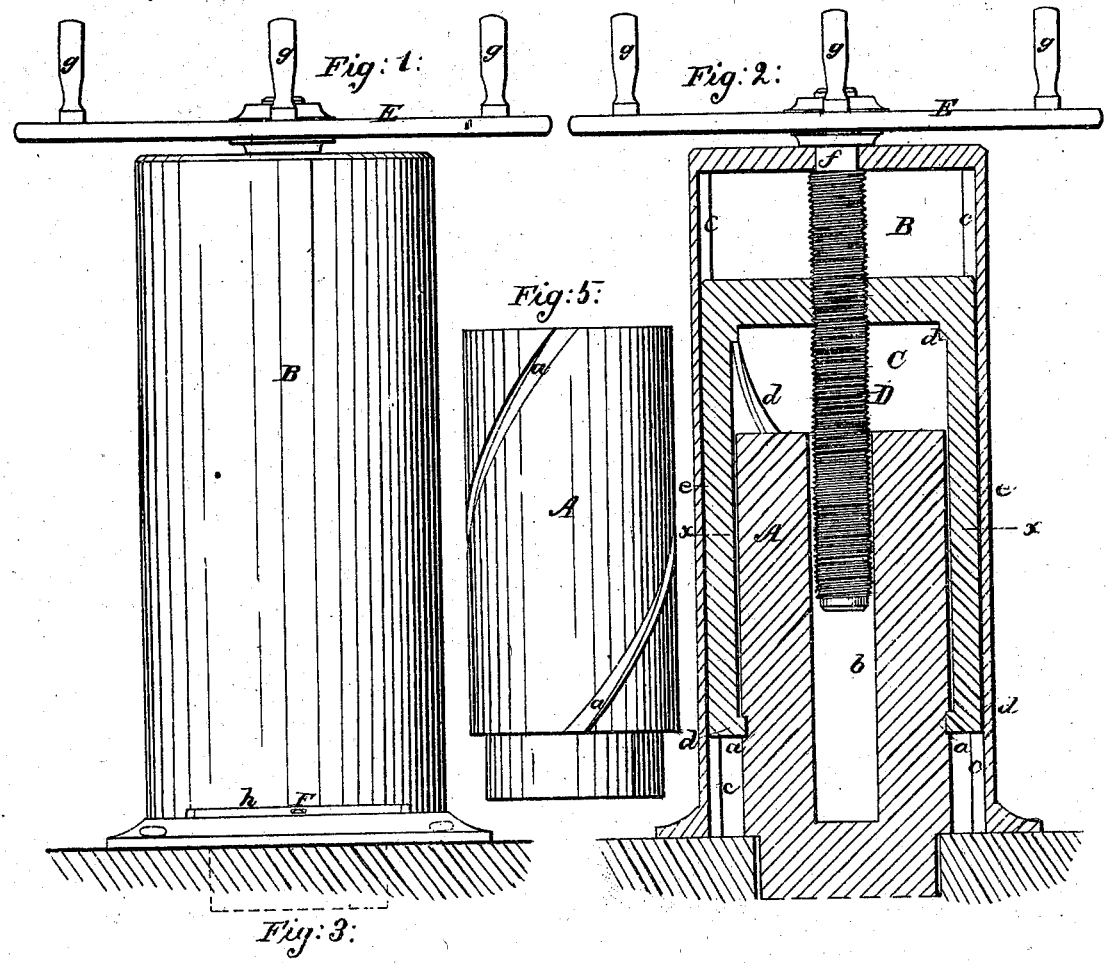
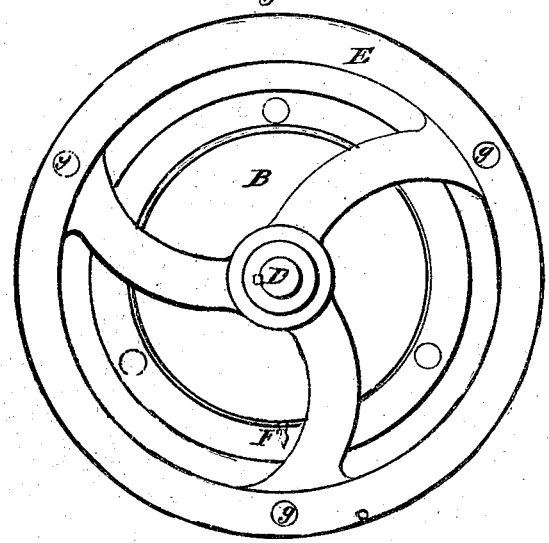
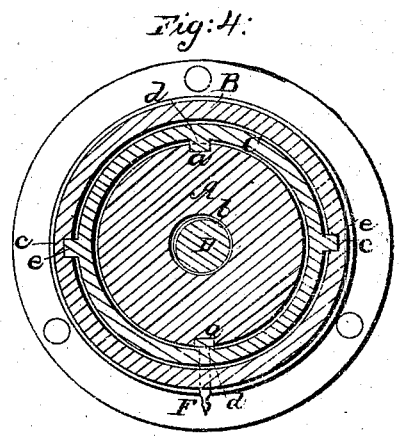

UNITED STATES PATENT OFFICE.

CHAS. F. BROWN, OF WARREN, RHODE ISLAND.

STEERING APPARATUS.

Specification of Letters Patent No. 7,516, dated July 22, 1850.

*To all whom it may concern:*

Be it known that I, CHARLES F. BROWN, of Warren, in the county of Bristol and State of Rhode Island, have invented a new and useful Improvement in the Manner of Operating the Rudders for Steering Ships and other Vessels; and I do hereby declare that the following is a full, clear, and exact description of the claim, reference being had to the accompanying drawings, forming part of this specification, in which—

Figure 1 is an elevation. Fig. 2, is a vertical section through the center. Fig. 3, is a plan or top view. Fig. 4, is a horizontal section taken in the line X, X, in Fig. 2. Fig. 5, is a detached view of the head of the rudder post.

Similar letters of reference indicate corresponding parts in each of the several figures.

The nature of my invention consists in operating the rudder by means of a steering wheel placed in a horizontal position directly above it; the wheel being firmly secured on the head of a screwed shaft, or spindle, which has a bearing in the crown of a hollow metal pillar encasing the head of the rudder post and secured to the deck or stage on which the steersman stands, and is prevented from moving up or down; the head of the rudder post is of metal or has a metal cap provided with any convenient number of helical grooves, and on this metal cap a hollow metal socket is placed having helical feathers or threads fitting to the grooves on the cap of the rudder post; the socket has also straight feathers fitting in grooves inside the pillar, and in its crown or head is a female screw in which the screwed spindle carrying the wheel fits; the wheel being turned in either direction, will cause the screw to elevate or depress the socket, and the helical threads or feathers in the socket acting upon the grooves in the head of the rudder post will cause the rudder to turn in the same direction as the wheel.

To enable others skilled in the art to make and use my invention I will proceed to describe fully its construction and operation.

A, Figs. 2, 4, and 5, represents the head of the rudder post which is of metal or capped with metal and is provided with two helical grooves $a, a$, which incline at an angle of about 30° from the axis; it is also provided with a recess $h$, the object of which will be hereafter described.

B, is a hollow metal pillar secured to the deck or to a stage on the vessel immediately over the rudder post, it is provided with two straight grooves or feather say $c, c$, extending up its inner sides, &c., its crown is bored at its center to receive the neck of the screw spindle.

C, is a hollow metal socket, provided inside with helical threads $d, d$, fitting to the grooves $a, a$, in the head of the rudder post, and forming a rapidly progressing screw and nut; it is also provided outside with two tabs or feathers $e, e$, (the section Fig. 2 being taken through them) fitting in the grooves $c, c$, in the pillar B, to keep it from turning round, the crown or head of the socket is provided with a hole having a female screw.

D, is a spindle having a male screw extending along it nearly its whole length, fitting to the female screw in the crown of the socket C, the thread being inclined in the same direction as that on the rudder post, its upper end has a neck $f$, turned smaller than the screw so as to leave a shoulder or may have a collar; the said neck fits the bore in the crown of the pillar B, the end of the screw passes without fitting into the recess $b$, in the head of the rudder post which is provided to receive it.

E, is the steering wheel keyed or otherwise firmly secured on the head of the screw spindle D, and provided with any suitable number of handles $a, a$, the screw spindle is prevented from moving up or down, the neck being confined above and below.

F, is a finger or indicator secured in the rudder post and passing through a slot $h$, near the bottom of the pillar, so arranged that when the helm is amidships the indicator is at the center of the slot, a graduated index may be marked out upon which the indicator will show the exact position of the rudder.

The operation is as follows: The wheel being turned either to the right or left, will cause the screw D, to elevate or depress the socket C, which is guided by the feathers $e, e$, and grooves $c, c$, in a direct line; the thread $d, d$, being set at so steep or rapid an inclination will act as wedges on the sides of the grooves *a a*, and turn the rudder in the same direction in which the wheel is turned.

The power gained by the application of the gradual screw D, over the rapidly progressing screw on the rudder post, is so great as to allow the rudder to be operated very easily; the friction of the parts will be but slight, as it is not necessary that the head of the rudder post should fit the socket C, or that the socket C, should fit the pillar, except on the bearing parts, or the threads and guides.

The room occupied by this steering apparatus is very small as all the working parts are inclosed within the pillar, which is but little larger than the rudder post; the parts, from their simple construction would not be liable to get out of order.

I have described two threads in the socket, and two grooves in the head of the rudder post, but any other number may be used, or the threads may be upon the post and the grooves in the socket.

What I claim as new in my invention and desire to secure by Letters Patent is—

Operating or turning the rudder by means of the socket C so guided that it can be moved only in the direction of its length, and having helical threads or grooves fitting to corresponding grooves or threads on the head of the rudder post, and being moved in either direction in the line of the axis of the rudder post by means of a screw D, attached to and operated by the steering wheel, substantially in the manner herein described.

C. F. BROWN.

Witnesses:
  GEORGE W. CARR,
  ALFRED BOSWORTH.